United States Patent [19]
Melgaard et al.

[11] Patent Number: 5,852,281
[45] Date of Patent: Dec. 22, 1998

[54] APPARATUS FOR HEATING LIQUIDS WITH STEAM SENSOR AND MULTIPLE STEAM PASSAGES

[75] Inventors: Klaus Melgaard; Michael J. Wenden, both of Hastings, England

[73] Assignee: U.S. Philips Corporation, New York, N.Y.

[21] Appl. No.: 935,253

[22] Filed: Sep. 22, 1997

Related U.S. Application Data

[63] Continuation of Ser. No. 566,028, Dec. 1, 1995, abandoned.

[30] Foreign Application Priority Data

Dec. 2, 1994 [GB] United Kingdom .................. 9424350

[51] Int. Cl.⁶ ...................................................... A47J 27/21
[52] U.S. Cl. .............................................. 219/441; 99/281
[58] Field of Search ..................... 219/436, 438, 219/441, 442; 99/281; 392/403–406

[56] References Cited

U.S. PATENT DOCUMENTS

| | | | |
|---|---|---|---|
| 2,987,607 | 6/1961 | Paulin | 219/442 |
| 3,539,774 | 11/1970 | Thornton | 219/442 |
| 3,784,788 | 1/1974 | Fourny | 219/441 |
| 4,418,270 | 11/1983 | Inskip et al. | 219/438 |
| 4,430,556 | 2/1984 | Inskip et al. | 219/441 |
| 4,544,830 | 10/1985 | Miller | 99/281 |
| 4,982,654 | 1/1991 | Bourgeois | 219/441 |
| 5,422,976 | 6/1995 | Knepler | 392/451 |

FOREIGN PATENT DOCUMENTS

| | | |
|---|---|---|
| 796584 | 9/1997 | European Pat. Off. . |
| 9-322855 | 12/1997 | Japan . |
| 2108825 | 5/1983 | United Kingdom . |
| 2152802 | 8/1985 | United Kingdom . |

*Primary Examiner*—John A. Jeffery
*Attorney, Agent, or Firm*—Ernestine C. Bartlett

[57] ABSTRACT

A hollow body (2) defines a receptacle (3) for liquid to be heated. A heating element (4) for heating liquid within the receptacle (3) is controlled by a control device (6) located in a control chamber (5). The control device (6) carries and is responsive to a steam sensor (7). A steam passage arrangement (10) defines first and second steam passages (120 and 130). The first steam passage (120) communicates with and extends downwardly from the steam outlet (3a) of the receptacle (3) to an outlet (5a) positioned away from the control device (6). The second steam passage (130) branches from the first steam passage (120) at a branching location (14) below the steam outlet (3a) of the receptacle (3) and extends to a location (13a) higher than the branching location (14), the steam sensor (7) being provided adjacent a steam aperture (15a) within the second steam passage (130) above the branching location (14).

11 Claims, 3 Drawing Sheets

5,852,281

APPARATUS FOR HEATING LIQUIDS WITH STEAM SENSOR AND MULTIPLE STEAM PASSAGES

This is a continuation of application Ser. No. 08/566,028, filed Dec. 1, 1995 now abandoned.

FIELD OF THE INVENTION

This invention relates to apparatus for heating liquids comprising a hollow body defining a receptacle for liquid to be heated, an electrical resistance heating element for heating liquid within the receptacle, a control chamber containing a control device carrying a steam sensor and being responsive to the steam sensor to control operation of the heating element and a steam passage arrangement provided between a steam outlet provided in an upper part of the receptacle and the steam sensor.

BACKGROUND OF THE INVENTION

Such apparatus is described in UK Patent Application Publication No. 2152802. The apparatus described in the afore-mentioned publication is a so-called jug kettle, that is the hollow body of the apparatus has a base and side walls with the body being taller than the width of its base wall and a handle that extends along the side wall. In this apparatus, the steam passage arrangement comprises one or a number of parallel steam channels defined by a recess within the handle and the adjacent exterior wall of the body. The steam passage(s) extends from a steam outlet provided at an upper part of the side wall of the receptacle to a steam sensor carried by a control device mounted in the control chamber which is, in this case, defined beneath the handle. Although such an arrangement allows for the detection of steam emitted through the steam outlet and so allows the heating element to be switched off automatically upon boiling of the liquid within the receptacle, it may also allow liquid droplets within the steam or condensed steam to pass over the control device which could be dangerous.

SUMMARY OF THE INVENTION

It is an aim of the present invention to provide apparatus for heating liquids having a steam passage arrangement that overcomes or at least mitigates the above-mentioned problems.

According to a first aspect of the present invention, there is provided apparatus for heating liquids comprising a hollow body defining a receptacle for liquid to be heated, a heating element for heating liquid within the receptacle, a control chamber containing a control device carrying a steam sensor and being responsive to the steam sensor to control operation of the heating element and a steam passage arrangement provided between a steam outlet provided in an upper part of the receptacle and the steam sensor, the steam passage arrangement comprising a first steam passage communicating with and extending downwardly from the steam outlet of the receptacle to an outlet positioned away from the control device and a second steam passage branching from the first steam passage at a branching location below the steam outlet of the receptacle and extending to a location higher than the branching location, the steam sensor being provided adjacent a steam aperture within the second steam passage above the branching location.

Thus, in apparatus in accordance with the first aspect of the present invention, the steam passage arrangement provides two steam passages with the second one branching off from the first and extending upwardly to a location at which the steam sensor is located. Thus, although steam will travel up the second passage, any liquid that inadvertently passes through the steam outlet of the receptacle or has condensed within the first steam passage will continue to travel down the first steam passage and so can be directed away from the control device.

According to a second aspect of the present invention, there is provided apparatus for heating liquids comprising a hollow body defining a receptacle for liquid to be heated, an electrical resistance heating element for heating liquid within the receptacle, a control chamber containing a control device carrying a steam sensor and being responsive to the steam sensor to control operation of the heating element and a steam passage arrangement provided between a steam outlet provided in an upper part of the receptacle and the steam sensor, the steam passage arrangement comprising a channel-defining member defining at least one open channel communicating with the steam outlet of the receptacle, and a cover member formed separately from the channel-defining member and covering the at least one open channel thereby defining with the channel-defining member at least one passage for steam, one of the channel-defining member and the cover member providing a coupling aperture by means of which the control device is mounted and electrically coupled to the heating element and the other of the channel-defining member and the cover member being provided with a steam aperture to enable steam within the at least one passage to reach the steam sensor.

The locations of the steam aperture in the cover member and the coupling aperture in the channel-defining member can be changed or adjusted relatively easily allowing the use of any one of a number of different commercially available control devices. This enables the apparatus manufacturer to use any suitable available control device and means that the apparatus manufacturer is not tied to or reliant on a single control device and a single control device supplier but can switch between different suitable types of control devices as the need arises, for example to provide a cost-saving or to meet a sudden increase in demand which cannot be supplied by the normal supplier.

In a preferred example of this second aspect, the channel-defining member defines a first open channel communicating with and extending downwardly from the steam outlet of the receptacle to an outlet positioned away from the control device and a second open channel branching from the first channel at a branching location below the steam outlet of the receptacle and extending to a location higher than the branching location and the cover member covers the first and second open channels, thereby defining with the channel-defining member first and second passages for steam, the steam aperture being at a location along the second channel above the branching location adjacent the steam sensor.

Thus, the steam passage arrangement again provides two steam passages with the second one branching off from the first and returning upwardly to a location at which the steam sensor is located. Although steam will travel up the second passage, any liquid that inadvertently passes through the steam outlet of the receptacle or has condensed within the first steam passage will continue to travel down the first passage and so can be directed away from the control device.

The channel-defining member may comprise a wall of the chamber. One of the channel-defining member and the cover member may comprise a portion of a wall of the hollow body defining the receptacle. For example, the channel-defining member may comprise a portion of a wall of the hollow body defining the receptacle and may be integrally formed with the body. Such a construction is particularly simple to manufacture, especially where the body is formed of a plastic material. As another possibility, the channel-defining member may comprise a separate component mounted to the body to facilitate manufacture of the channel-defining member where the body is formed of a material which may be rather difficult to form into relatively complicated shapes. Thus, for example, in this case, the body may be formed of a material such as stainless steel while the channel-defining member may be formed separately from a suitable plastic material.

The second channel generally extends at an acute angle to the first channel, so providing a relatively simple arrangement. However, other arrangements may be possible, for example, the second channel could be U-shaped.

The channel-defining member may have partition walls projecting therefrom to define the first and second channels. The first and second channels may be rectangular in cross-section thus facilitating closure by the cover member which may then be simply formed as a substantially planar member and need not be shaped to fit the channels.

BRIEF DESCRIPTION OF THE DRAWINGS

Embodiments of the present invention will now be described, by way of example, with reference to the accompanying drawings, in which.

It should of course be understood that the drawings are not to scale and that like reference numerals are used through text to refer to like parts.

DETAILED DESCRIPTION OF THE PREFERRED EMBODIMENTS

Figure 1:
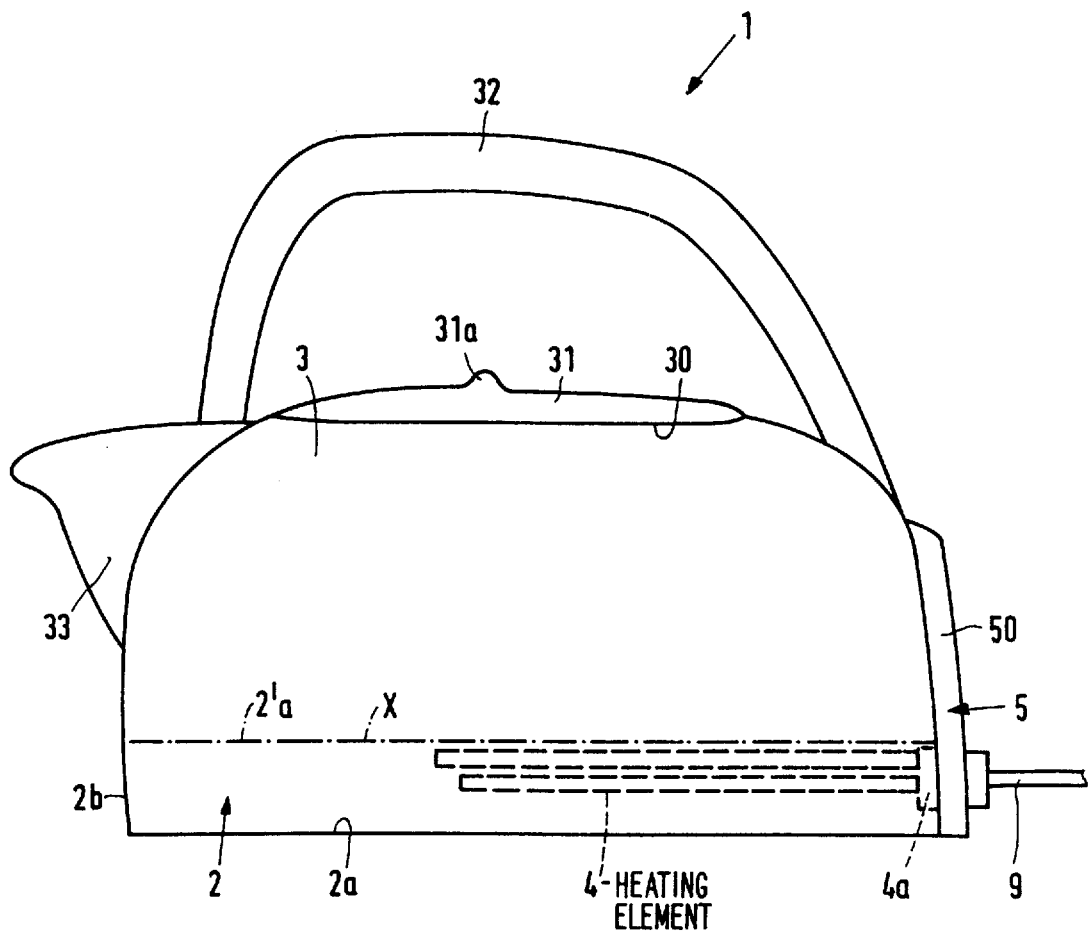
FIG. 1 is a schematic side view of an apparatus for heating liquids in accordance with the invention.

Referring now to the drawings, there is illustrated an apparatus 1 for heating liquids comprising a hollow body 2 defining a receptacle 3 for liquid to be heated, a heating element 4 for heating liquid within the receptacle 3, a control chamber 5 containing a control device 6 carrying a steam sensor 7 and being responsive to the steam sensor 7 to control operation of the heating element 4 and a steam passage arrangement 10 provided between a steam outlet 3a provided in an upper part of the receptacle 3 and the steam sensor 7, the steam passage arrangement 10 comprising a first steam passage 120 communicating with and extending downwardly from the steam outlet 3a of the receptacle 3 to an outlet 120a positioned away from the control device 6 and a second steam passage 130 branching from the first steam passage 120 at a branching location 14 below the steam outlet 3a of the receptacle 3 and extending to a location 13a higher than the branching location 14, the steam sensor 7 being provided adjacent a steam aperture 15a within the second steam passage 130 above the branching location 14.

Thus, in an apparatus in accordance with the first aspect of the present invention, the steam passage arrangement provides two steam passages 120 and 130 with the second passage 130 branching off from the first passage 120 and returning upwardly to a location at which the steam sensor is located. Although steam will travel up the second passage 130, any liquid that inadvertently passes through the steam outlet 3a of the receptacle 3 or has condensed within the first steam passage 120 will continue to travel down the first passage 120 and so can be directed away from the control device 6.

In the example illustrated in the Figures, the steam passage arrangement 10 comprises a channel-defining member 11 defining a first open channel 12 communicating with and extending downwardly from the steam outlet 3a of the receptacle 3 to an outlet 120a positioned away from the control device 6 and a second open channel 13 branching from the first channel 12 at a branching location 14 below the steam outlet 3a of the receptacle 3 and extending to a location 13a higher than the branching location 14, and a cover member 15 formed separately from the channel-defining member 11 and covering the first and second open channels 12 and 13, thereby defining with the channel-defining member 11 the first and second steam passages 120 and 130. One of the channel-defining member 11 and the cover member 15, in this case the channel-defining member 11, provides a coupling aperture 11a by means of which the control device 6 is mounted and electrically coupled to the heating element 4 and the other of the channel-defining member 11 and the cover member 15, in this case the cover member 15, is provided with a steam aperture 15a disposed between a location 13b along the second channel 13 above the branching location 14 and the steam sensor 7 to enable steam within the second passage 130 to reach the steam sensor 7.

In such apparatus, the locations of the steam aperture 15a in the cover member 15 and the coupling aperture 11a in the channel-defining member 11 can be changed or adjusted relatively easily allowing the use of one of a number of different commercially available control devices 6. This enables the apparatus manufacturer to use any suitable available control device and means that the apparatus manufacturer is not tied to or reliant on a single control device and a single control device supplier but can switch between different suitable types of control devices as the need arises, for example to provide a cost-saving or to meet a sudden increase in demand which cannot be supplied by the normal supplier.

Referring now specifically to the drawings, FIG. 1 shows very schematically a so-called conventional electric kettle, that is an apparatus for heating liquid, generally water, in which the hollow body 2 defines a base wall 2a and a side wall or walls 2b of the receptacle 3 with the base wall 2a having a width, generally a diameter as the base wall is usually approximately circular, greater than the height of the side wall 2b. The receptacle 3 may have, as shown, an upper opening 30 which is closed by a removable lid 31 having a knob 31a. A handle 32 for enabling lifting of the kettle to allow filling or emptying extends across the lid 30. The receptacle 3 has a spout 33 for enabling liquid to be poured into or out of the receptacle 3. Where the hollow body 2 is formed of a suitable plastic material such as polyethylene then the handle and spout may be molded integrally with the rest of the hollow body 2 using, for example, a suitable injection moulding technique in which the body 2 may be formed in an upper and a lower portion which are then joined by a suitable technique such as welding.

In the example shown, the heating element 4 (shown in phantom lines in FIG. 1) extends within the receptacle 3 so as to be in contact with the liquid being heated and is in the form of sheathed resistance heating element wire as is well known in the art and as is commonly used in commercially available electric kettles. Of course, any other suitable form of heating element, such as a thick film resistance heating element may be used. Moreover, instead of being exposed within the receptacle 3, the heating element 4 may be hidden beneath but in thermal contact with a heat conductive base wall, generally a metal base wall, of the body. Where the body 2 has a base wall formed of metal then the remainder of the body 2 may still be formed of a suitable plastic material and sealed to the base wall 2a using any suitable technique, for example one of those described in EP-A-0285839.

Where a hidden heating element is used, then, the lower portion of the body (as indicated roughly by the dot-dash line X in FIG. 1) will be formed by a separate component defining a chamber beneath the receptacle 3 containing the heating element 4 and providing access to enable coupling of the control device 6 to the heating element 4. In this case, the base wall 2'a of the receptacle will be at the position of the dot-dash line X in FIG. 1.

The control device 6 and steam passage arrangement 10 are located in a control chamber 5 provided on the side wall 2b of the body 2 opposite the spout 33.

In the example being described, at least the side wall or walls 2b of the hollow body 2 are formed of a suitable heat-resistant plastic material and the channel-defining member 11 is defined as an integral part of the side wall 2b of the hollow body 2 by use of an appropriate mold. Thus, as indicated by the exploded view of FIG. 2, the hollow body 2 is molded to define a recess 110 in the outer surface 20b of the side wall 2b. The recess 110 has a wall thickness similar to that of the rest of the side wall 2b and so, when viewed from within the receptacle 3, projects into the receptacle 3. This should reduce the amount of additional plastic material required to form the recess 110 and should, at the expense of a very slight reduction in the capacity of the receptacle 3, reduce the amount of space required for the steam passage arrangement 10 in the chamber 5. Of course, if space within the chamber 5 is not a problem and it is desired that the interior surface of the receptacle 3 be smooth, then the channel-defining member 11 may project outwardly from the side wall 2b instead.

Figure 2:
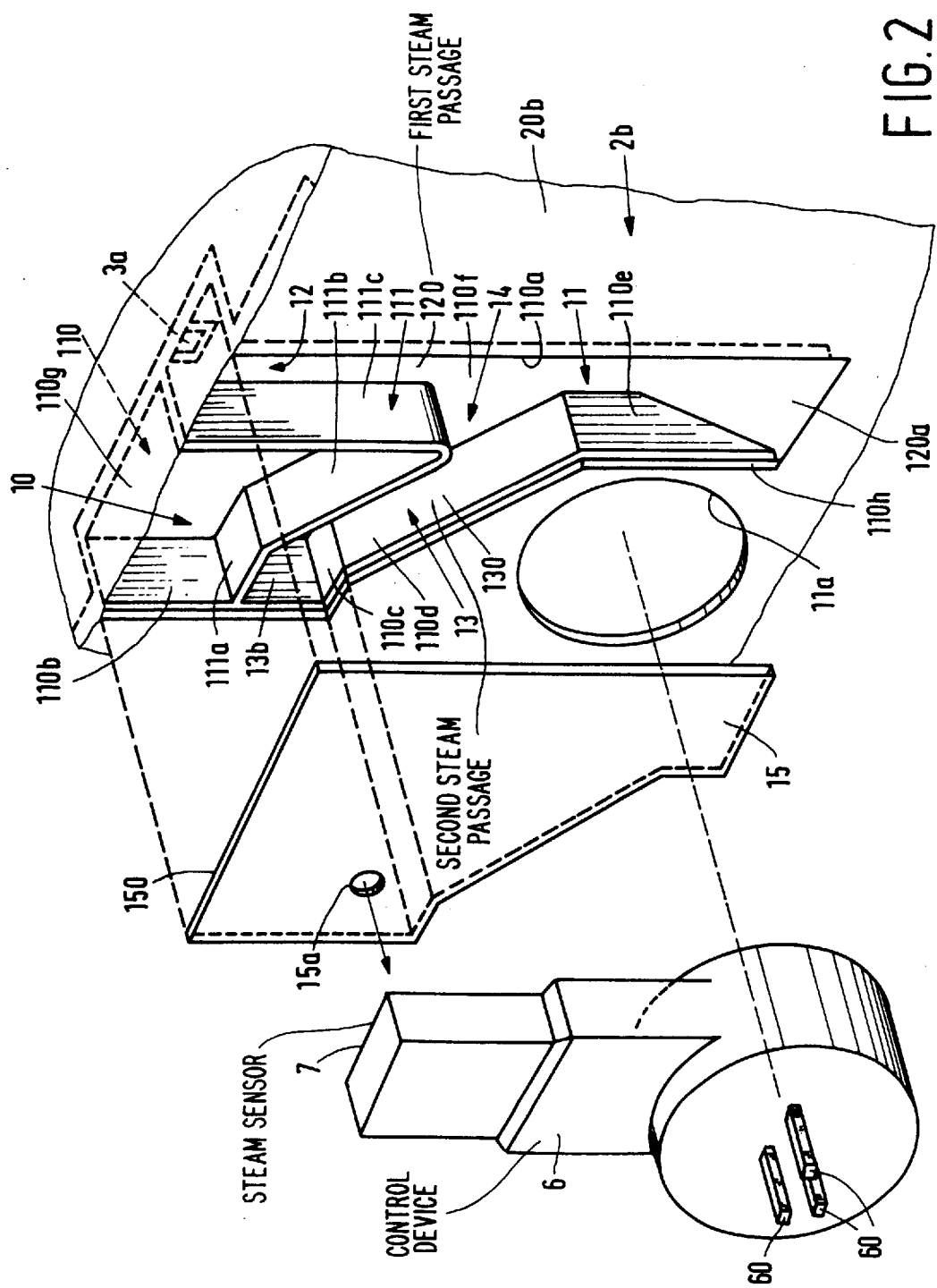
FIG. 2 is an exploded perspective view of part of the apparatus shown in FIG. 2.

In the example illustrated, the steam outlet 3a of the receptacle 3 is formed near the top of the recess 110. The recess 110 has first and second generally parallel boundary walls 110a and 110b extending generally perpendicularly of the back wall 110' and the base wall 2a of the hollow body 2. The wall 110b is shorter than the wall 110a and forms a generally right angle corner with a further boundary wall 110c which is itself connected to a sloping boundary wall 110d which extends at an angle of less than 90° to the further boundary wall 110c. The sloping boundary wall 110d is joined to a further boundary wall 110e extending generally parallel to the walls 110a and 110b. The rear surface 110f of the recess 110 is generally planar but may, as shown in FIG. 2, slope forwardly adjacent the wall 110e to define a reduced depth section of the recess which, as will be explained below, forms an outlet 120a of the first steam passage 120. The recess 110 also has a top wall 110g.

A partition wall 111 integrally formed within the recess 110 has first and second sections 111a and 111b extending generally parallel to the walls 110c and 110d, respectively, and a third section 111c which extends generally parallel to the wall 110a at an acute angle to the section 111b. These walls of the recess 110 and the partition 111 thus define the first and second channels 12 and 13 with the first channel extending down the side wall 2b generally perpendicularly of the base wall 2a and the second channel 130 extending from the branching location 14 midway along the first channel 12 at an acute angle to the first channel and back up towards the steam outlet 3a.

Of course, the channel-defining member 11 may be of any suitable shape and may define any suitable geometry of first and second channels 12 and 13. Thus, for example, the channels need not be of rectangular cross-section but could be of, for example, semi-circular cross-section. Also, the second channel 13 need not be straight but could be, for example, U-shaped.

Figure 3:
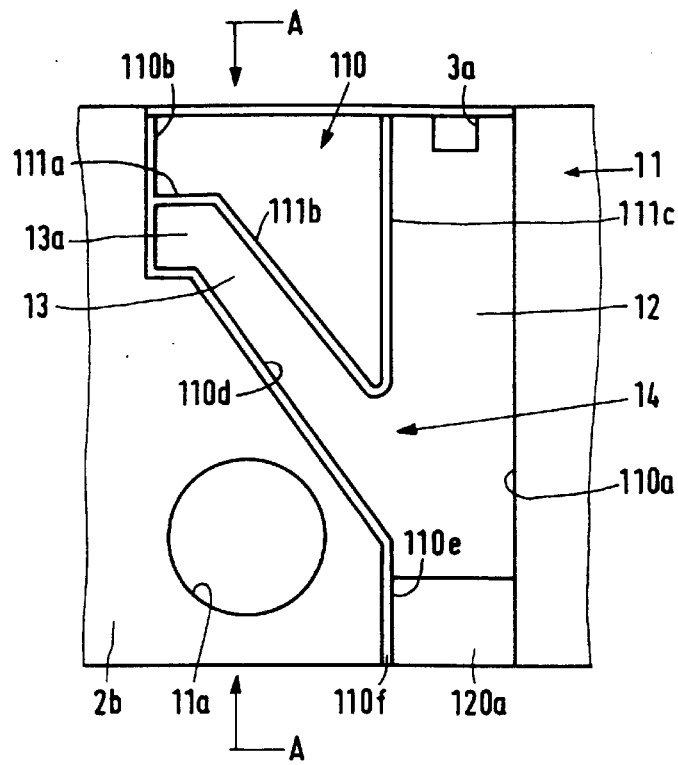
FIG. 3 is a plan view of the channel-defining member shown in FIG. 2.
Figure 4:
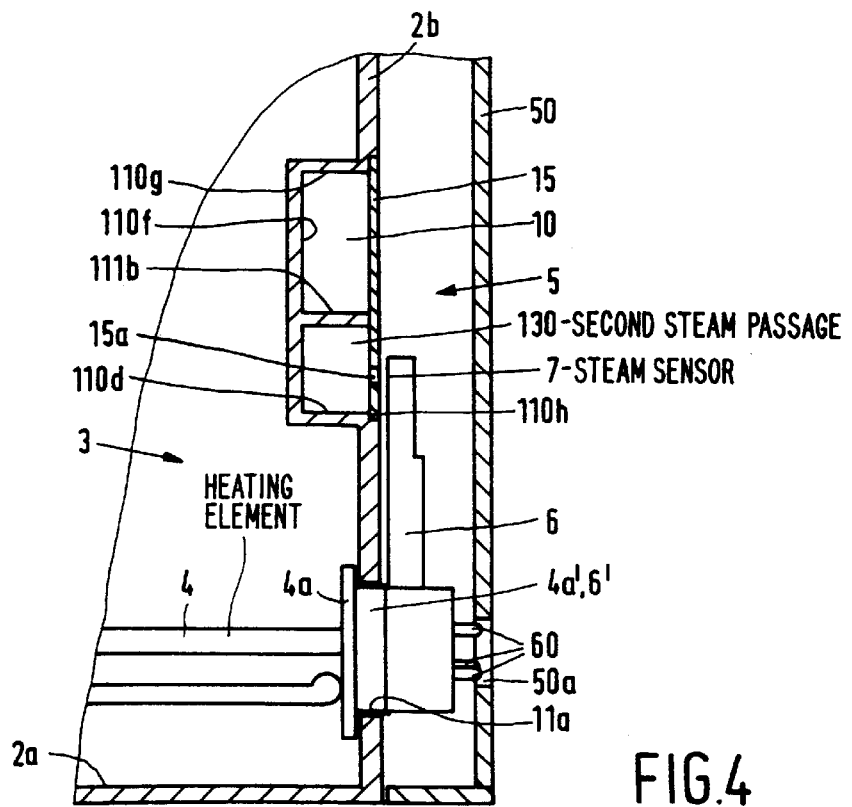
FIG. 4 is a cross-sectional view taken along the line A—A in FIG. 3 of part of the apparatus in an assembled condition.

In the example shown in FIGS. 2 to 4, the recess 110 has a peripheral lip 100h which is shaped to receive the periphery 150 of the cover member 15. When fitted to the recess 110, the cover member 15 is, as shown in FIG. 4, flush with the rest of the side wall 2b. The cover member 15 of course has a shape corresponding to the shape of the periphery 110 of the recess 110 and is generally planar although it might have a slight curvature to follow and match the curvature of the side wall 2b. The cover member 15 may be removably secured to the recess 110 by, for example, screws or the like, or may be sealed, for example welded, in place.

Of course, the cover member 15 could be provided by part of the body 2 and the channel-defining member 11 instead formed as a separate component attached to the body to define therewith the steam passages 120 and 130, with, of course, the steam aperture 15a then being provided by the channel-defining member 11 and the coupling aperture 11a by the cover member 15. Such an arrangement may well be advantageous where it is difficult to define relatively complicated shapes in the body 2, for example where the body 2 is formed of a metal such as stainless steel.

The steam aperture 15a formed within the cover member 15 is interposed between the steam sensor 7 carried by the control device 6 and the second channel 13. The coupling aperture 11a for the control device 6 is formed in the area of the side wall 2b of the receptacle 3 beneath the sloping wall 110d.

The actual location of the coupling aperture 11a on the area of the side wall 2b and the location of the steam aperture 15a may be adjusted relatively easily without any need for a change in the molding tools by, for example, adjusting the position of a blanking plate within the mold used to form that part. As another possible alternative, the coupling aperture 11a or the steam aperture 15a may be machined after the part has been molded. This ability to adjust the locations of the coupling and steam apertures 11a and 15a should enable different types of control devices 6 to be used without having to make drastic and expensive changes to the molding tools used to form the apparatus.

The control device 6 is coupled to the head 4a of the heating element 4 using any suitable conventional technique via the coupling aperture 11a. For example, the head 4a and the control device 6 may carry cooperating screw-threaded portions 4a' and 6' or the like. A suitable sealing element, such as a rubber O-ring may be provided within the coupling aperture 11a to ensure a water-tight seal.

As indicated above, the control device 6 may be any one of a number of different types of commercially available control devices which, in addition to a steam-operated cut-out, carry a boil-dry cut-out such as a bimetal which responds to the increase in the temperature of the heating element 4 when the apparatus is operated such that the heating element 4 becomes exposed during operation to cut-off the power supply to the heating element 4 and a further safety cut-out which operates in the event of overheating of the element 4 and failure of the boil-dry cut-out. This further or back-up protection may be provided by a bimetal device or a thermal fuse, for example. The steam sensor is not shown in any detail in the Figures but may be any suitable type of sensor, such as a thermistor, another bimetal or a memory metal element.

The control device 6 is provided with terminal pins 60 (generally, as shown and as for the United Kingdom, a live, a neutral and an earth terminal pin) which in use of the apparatus are coupled to corresponding sockets of a mains power supply lead 9, part of which is shown in FIG. 1, to enable power to be supplied to the heating element 4. Suitable control devices 6 are, for example, manufactured and supplied by Otter Controls Limited and Strix Limited.

An outer cover member 50 which is generally formed of a plastic material (see FIGS. 1 and 4) is secured, for example clipped or screwed, to the body 2 to close the control chamber 5 containing the control device 6 and the steam passage arrangement 10. The outer cover member 50 is provided with an aperture 50a for enabling the mains power supply lead 9 to be coupled to the terminal pins 60 and may have at least one further aperture (not shown) for receiving a user operated ON/OFF switch coupled to the control device 6 in known manner.

In operation of the apparatus 1, when the receptacle 3 has been filled with liquid to be heated, generally water, and the mains power supply lead 9 plugged in, the heating element 4 heats the water in the receptacle 3 until the water boils when steam rises from the liquid. Steam passing through the steam outlet 3a of the receptacle 3 passes down the first steam passage 120 defined by the first open channel 12 and the cover member 15 and up the second passage 130 defined by the second open channel 13 and the cover member 15 to the steam aperture 15a where it is sensed by the steam sensor 7 which operates the control device 6 to cut-off the power supply to the heating element 4. Any water droplets or condensed steam will, however, not pass up the second steam passage 130 but will continue to travel down the first steam passage 120 to the outlet 120a. Accordingly any water within the steam passage arrangement 10 will be diverted away from the control device 6 and may collect in a special chamber (not shown) provided beneath the outlet 120a or may, because the quantity of water involved will only be very small, simply be allowed to exit the apparatus 1 via a suitable opening. Where a special chamber is provided, then arrangements may be made to allow the user to empty it, for example such a chamber may be in the form of a small drawer received in the outer cover member 50 and extending beneath the outlet 120a. Such an arrangement avoids allowing any water to drip onto the control device 6 which could otherwise result in an electrical short or other problem if the water finds a way into the control device 6.

Although the above description refers to conventional type kettles, the present invention could also be applied to so-called jug kettles in which the width of the base wall 2a is much smaller than the height of the side wall 2b and the handle extends along the side wall, with appropriate dimensioning of the channel-defining member 11 and the cover member 15. In such a case, the outer cover member of the control chamber would probably also form at least part of the handle in a similar manner to that described in GB-A-21 52802. Furthermore, the present invention could be applied to apparatus where the body is formed of metal by either shaping the metal body to define the channel-defining member or by forming the channel defining member as a separate component, probably a molded plastic component, secured to the outer surface of the metal body with the coupling aperture 11 a aligned with a corresponding aperture machined in the side wall of the metal body or by providing the cover member 15 as part of the body 2 and the channel-defining member 11 as a separate component with, of course, the steam aperture 15a then being provided by the channel-defining member 11 and the coupling aperture 11a by the cover member 15.

Although in the examples described above, the apparatus is shown as being 'corded' that is with the mains supply lead 9 coupled directly to the body 2, the present invention may also be applied to so-called 'cordless' apparatus where the body 2 sits and is reusable from a base or support via which power is supplied to the heating element.

From reading the present disclosure, other modifications and variations will be apparent to persons skilled in the art. Such modifications and variations may involve other features which are already known in the art and which may be used instead of or in addition to features already described herein. Although claims have been formulated in this application to particular combinations of features, it should be understood that the scope of the disclosure of the present application also includes any novel feature or combination of features disclosed herein either explicitly or implicitly, whether or not relating to the same invention as presently claimed in any claim and whether or not it mitigates any or all of the same technical problems as does the presently claimed invention.

We claim:

1. An apparatus for heating liquids comprising a hollow body defining a receptacle for liquid to be heated, a heating element for heating liquid within the receptacle, a spout for enabling liquid to be poured into or out of the receptacle, a control chamber containing a control device carrying a steam sensor and being responsive to the steam sensor to control operation of the heating element, a steam outlet provided in an upper part of the receptacle in a location remote from said spout and a steam passage arrangement provided between the steam outlet and the steam sensor, the steam passage arrangement comprising a first steam passage separate from the spout and communicating with and extending downwardly from the steam outlet of the receptacle to an outlet positioned away from the control device and a second steam passage branching from the first steam passage at a branching location below the steam outlet of the receptacle and extending to a location higher than the branching location, the steam sensor being provided adjacent a steam aperture within the second steam passage above the branching location.

2. An apparatus for heating liquids comprising a hollow body defining a receptacle for liquid to be heated, an electrical resistance heating element for heating liquid within the receptacle, a control chamber containing a control device carrying a steam sensor and being responsive to the steam sensor to control operation of the heating element and a steam passage arrangement provided between a steam outlet provided in an upper part of the receptacle and the steam sensor, the steam passage arrangement comprising a channel-defining member defining at least one open channel communicating with the steam outlet of the receptacle, and a cover member formed separately from the channel-defining member and covering the at least one open channel thereby defining with the channel-defining member at least one passage for steam, a member selected from the group of (a) the channel-defining member and (b) the cover member providing a coupling aperture by means of which the control device is mounted and electrically coupled to the heating element and the other member selected from the group of the channel-defining member and the cover member being provided with a steam aperture to enable steam within the at least one passage to reach the steam sensor.

3. An apparatus according to claim 2, wherein the channel-defining member defines a first open channel communicating with and extending downwardly from the steam outlet of the receptacle to an outlet positioned away from the control device and a second open channel branching from the first channel at a branching location below the steam outlet of the receptacle and extending to a location higher than the branching location, wherein the cover member covers the first and second open channels, thereby defining with the channel-defining member first and second passages for steam, and the steam aperture is at a location along the second channel above the branching location adjacent the steam sensor.

4. An apparatus according to claim 3, wherein the second channel extends at an acute angle to the first channel.

5. An apparatus according to claim 2, wherein at least one channel is defined by partition walls projecting from a surface of the channel-defining member.

6. An apparatus according to any one of claim 2, wherein at least one channel is rectangular in cross-section.

7. An apparatus according to claim 2, wherein the channel-defining member comprises a wall of the chamber.

8. An apparatus according to claim 2, wherein either the channel-defining member or the cover member comprises a portion of a wall of the hollow body defining the receptacle.

9. An apparatus according to claim 2, wherein the channel-defining member is an integrally formed plastics member.

10. An apparatus according to claim 2 wherein the cover member is substantially planar.

11. An apparatus according to claim 2 wherein the channel-defining member provides the coupling aperture and the cover member provides the steam aperture.

* * * * *